(12) United States Patent
Beck

(10) Patent No.: US 6,697,724 B2
(45) Date of Patent: Feb. 24, 2004

(54) AUTOMATIC STEERING SYSTEM USING SIGNAL QUALITY INFORMATION

(75) Inventor: Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/173,460

(22) Filed: Jun. 14, 2002

(65) Prior Publication Data

US 2002/0193929 A1 Dec. 19, 2002

(30) Foreign Application Priority Data

Jun. 16, 2001 (DE) .......................... 101 29 133

(51) Int. Cl.[7] ................................................ B62D 6/00
(52) U.S. Cl. .......................................... 701/50; 701/41
(58) Field of Search .......................... 701/41, 50, 213, 701/23, 25, 216; 56/10.1; 342/357.08, 357.01, 357.06

(56) References Cited

U.S. PATENT DOCUMENTS

| | | | |
|---|---|---|---|
| 4,228,636 A | 10/1980 | Homburg | ..................... 56/10.2 |
| 5,229,941 A | * 7/1993 | Hattori | ..................... 701/26 |
| 5,752,374 A | 5/1998 | Allworden et al. | ........... 56/341 |
| 6,095,254 A | 8/2000 | Homburg | ..................... 172/6 |
| 6,128,574 A | 10/2000 | Diekhans | ..................... 701/209 |

FOREIGN PATENT DOCUMENTS

| | | |
|---|---|---|
| DE | 195 30 356 A1 | 4/1997 |
| DE | 198 58 157 A1 | 6/2000 |
| DE | 198 58 168 A1 | 6/2000 |
| EP | 0 821 296 A2 | 1/1998 |
| EP | 0 887 660 A2 | 12/1998 |
| WO | 94/24845 | 11/1994 |

* cited by examiner

Primary Examiner—Yonel Beaulieu

(57) ABSTRACT

An automatic steering system is provided with a first position sensor for generating a first position signal and a second position sensor for generating a second position signal. Both position signals are communicated to a controller having a memory. The controller is also supplied signal quality information about the quality of the position signals. The controller evaluates the position signals based on the signal quality information and weights the position signals accordingly to calculate the position of the vehicle and select the vehicle's target path. The target path is selected from several target paths and is the best that corresponds to the position of the vehicle. The controller then generates a steering signal that is communicated to a steering controller for steering the vehicle.

28 Claims, 3 Drawing Sheets

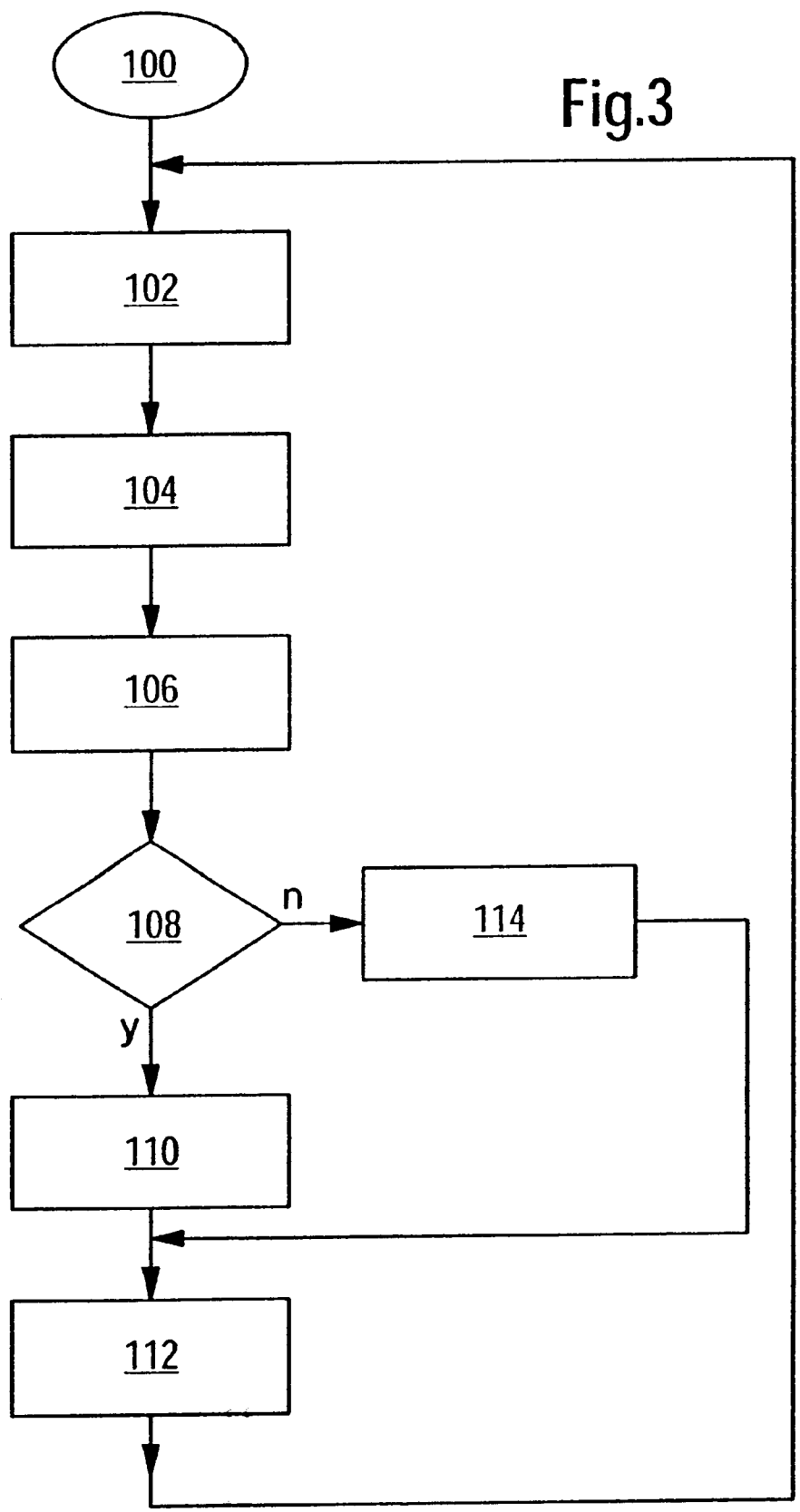

AUTOMATIC STEERING SYSTEM USING SIGNAL QUALITY INFORMATION

FIELD OF THE INVENTION

The present invention is directed to a system for automatically steering a utility vehicle, wherein signal quality information from two position sensors is evaluated and used to steer the utility vehicle along an intended target path.

BACKGROUND OF THE INVENTION

WO 94/24845 A and U.S. Pat. No. 6,128,574 disclose an automatic steering system for agricultural vehicles, wherein the system locates the vehicle on the basis of its immediate position and its intended target path. The position is determined from a location sensor receiving satellite location signals (GPS or DGPS). In this way the automatic steering system can continue to steer the vehicle even if the satellite location signals fail. U.S. Pat. No. 6,128,574 discloses that the utility vehicle is equipped with operating direction sensors and velocity sensors. Both references propose that the signals of the satellite system be supplemented by sensors attached to the utility vehicle, that can detect, for example, the crop edge of a standing crop or windrow. The crop edge can be detected, according to WO 94/24845 A, by an image operating system or, according to U.S. Pat. No. 6,128,574, by a reflex location system (such as, for example, a laser scanner) or by a harvested edge orientation system relying on mechanical contact with the crop.

In both cases cited above, the steering is performed exclusively on the basis of a map previously stored in memory, that defines the path to be followed. However, in some applications no map of the area to be processed may be available and the generation of a map would be uneconomical.

SUMMARY OF THE INVENTION

It is an object of the present invention to provide an improved automatic steering system for a utility vehicle that is highly accurate.

The automatic steering system of the present invention is provided with a first position sensor for generating a first position signal and a second position sensor for generating a second position signal. The first position sensor and the second position sensor are independent of one another. Both position signals are communicated to a controller having a memory. The controller is also supplied signal quality information about the quality of at least one of the position signals. The controller evaluates the position signals based on the signal quality information and weights the position signals accordingly to calculate the position of the vehicle and select the vehicle's target path. The target path is selected from several target paths. The selected target path is the best path that corresponds to the position of the vehicle. Based on the position signal and the selected target path, the controller generates a steering signal that is communicated to a steering controller for steering the vehicle.

The controller can steer the vehicle along a target path defined by a fixed object (boundary of operation). The fixed object could be a crop edge that the vehicle is steered along during a harvesting operation. In this case the target path information corresponds to the intended position of the utility vehicle relative to the boundary of operation. A digital map generated in advance of the area to be processed is not required. If the signal quality information indicates the accuracy of the position signal is not adequate, the controller then derives the selected target path from previously recorded position information that was automatically recorded in the memory in the form of a map. Storing the position information is in the form of a learning operation. The steering then is controlled on the basis of the signal form the other position sensor. The target path information then corresponds to the map that was stored in memory to define the path to be followed. If it is found later on the basis of the signal quality information that the position signal detecting the boundary of operation is again adequate, the latter can again be used for steering the utility vehicle. Similarly, if the vehicle is steered from the satellite signals generated position signal along a path from a stored map, and the satellite signals cease, the other position sensor sensing the boundary of operation and a movement sensor can be used by the controller to generate a steering signal, the target path information now no longer corresponds to the map, but to the intended transverse distance to the boundary of operation.

In this way it becomes possible to equip an agricultural utility vehicle with several different position sensors and to automatically steer it on the basis of the most appropriate target path information conforming to the most appropriate position signals. The target path information is not necessarily derived from a pre-stored map, but from information that is relatively easy to obtain, for example, the desired position of a boundary of operation or information about a path that has already been covered.

In a preferred embodiment of the invention it is proposed that the controller gives weighted consideration to the position signals of the first and the second position sensor in the generation of the steering signal on the basis of the quality information that has been supplied to the controller. If the quality information points to a relatively high degree of accuracy of the first position signal, that first signal is considered exclusively or at least to a great proportion in the calculation of the steering signal. The second position signal is considered only in a small proportion or not at all. Analogously the first position signal is ignored or considered only in a small proportion, if the quality information points to a low accuracy of the first position information. With approximately median accuracy of the first and the second position signals, the first and the second position signal can be considered with equal weight. The target path information is selected accordingly.

Preferably the controller is provided with signal quality information for both position signals. The controller also uses this information, in order to establish which position signal is considered and to which degree it is considered.

The first position signal can be generated by satellite signals that can be generated by the GPS (global positioning system). However, the use of an inertial navigation system is also conceivable.

The second position signal can be generated by a local sensor on the agricultural utility vehicle. The local sensor can detect the movement of the utility vehicle (start, direction and velocity and possibly also the inclination of the terrain). Alternatively or in addition the local sensor is a sensor that can detect the position of the utility vehicle relative to a stationary object, particularly the boundary of an operation. Sensors of this type are sufficiently well known in the form of image processing systems, laser scanning sensors or mechanical scanning arrangements for the detection of rows of crop as are used in automatic steering systems for harvesting machines. Sensors for measurement of width of cut on cutter heads can also be used.

With laser scanning sensors there is occasionally the problem that the sensors can no longer recognize an edge. This problem occurs at that time, for example, when the edge is relatively low, several crop edges lie side-by-side, the harvesting machine rounds a curve or at the beginning of a harvest operation wherein the crop edge cannot be recognized. Therefore in the preferred embodiment, the controller stores previously position information indicating the path covered by the vehicle and the expected position of the boundary of operation. In that way if the headlands are harvested from the field at the beginning of a harvesting operation and if thereby the outline of the field is known to the controller by its record of the positions previously covered, then information is available as to which portion of the field has been harvested. This information can be utilized if the laser scanning sensor is not in the position to detect the boundary of operation automatically. This information can also be used upon the entry into the stand of the crop in order to establish the position of the boundary of operation so as to orient the sensor. The prediction of the controller relies on the assumption that the paths of the operation run steadily and parallel to the preceding path. Only edges corresponding to such paths are used by the laser scanning sensor as possible locations for the crop edge. Crop edges that extend at an angle or at implausible spacing distances from the previously detected path may be ignored. In order to recognize crop edges running at angles, all detected crop edges are stored in memory for a period of time so that the path of the vehicle along the crop edge can be recognized. If during operation around curves the boundary of the operation has reached beyond the measurement region of the laser scanning sensor, the angular scanning region of the laser scanning sensor can be oriented anew on the basis of the position detected. This is performed internally within the sensor by changing the position of lenses, transmitter and receiver and/or by rotating the entire sensor unit.

By estimating the position of the boundary of operation the scanning angle of a laser scanning sensor can be reduced by the controller to a region where the boundary of operation is expected. Thereby higher scanning rates and better control response can be attained at higher forward propulsion velocities. Nevertheless during the narrowing of the scanning sensor region the quality (accuracy) of the available position data must also be considered.

BRIEF DESCRIPTION OF THE DRAWINGS

FIG. 3 shows a flow chart according to which the controller operates.

DETAILED DESCRIPTION

Figure 1:
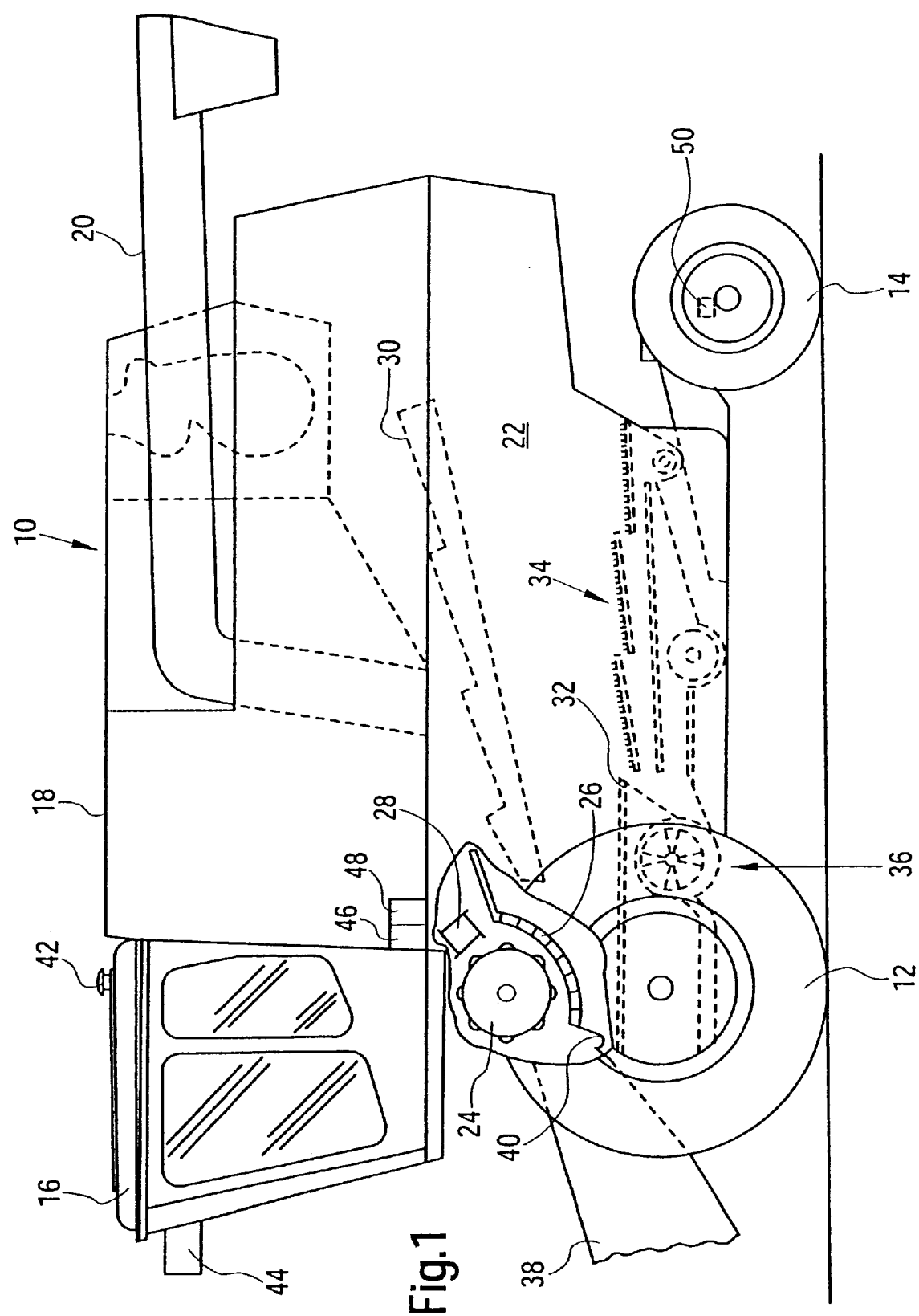
FIG. 1 shows an agricultural utility vehicle with an arrangement according to the invention for automatic steering.

The utility vehicle 10, illustrated in FIG. 1, is an agricultural combine. The combine is supported on front driven and rear steerable wheels 12 and 14, respectively, and is provided with an operator's cab 16 from which it is controlled by an operator. The present invention could also be used on other utility vehicles, such as, self propelled forage harvesters, self-propelled large balers and tractors having ground engaging implements or seeding machines. A grain tank 18 is located behind the operator's cab 16. The grain tank 18 is used for temporarily storing clean grain until it is transferred to a grain cart or truck by unloading auger 20.

The grain tank 18 is supported on a frame 22 formed by two side sheets. The harvested crop is separated into its large and small components within the side sheets. The crop is first harvested by a harvesting assembly 64 (See FIG. 2) and from the harvesting assembly 64 the harvested crop is directed to a feeder house 38. The feeder house 38 is an upwardly sloping conveyor which conveys the harvested crop past a stone trap 40 to a threshing assembly. The threshing assembly comprises a threshing cylinder 24 with associated concave 26 and a beater 28. The threshed crop material is transferred to a separation assembly comprising straw walkers 30 which expand the threshed crop mat to release grain trapped in this mat. Clean grain and chaff falling from the concave 26 and the straw walkers 30 is directed to a grain pan 32. Crop material other than grain is expelled over the rear of the straw walkers 30 and out of the combine. The grain pan 32 directs the clean grain and chaff to a cleaning assembly which comprises sieves 34 and a cleaning fan 36. The cleaning fan 36 blows the chaff out the rear of the combine, whereas the clean grain falls downwardly and is collected on the floor of the combine. The clean grain is transferred upwardly by a clean grain elevator to the grain tank 18.

The roof of the operator's cab 16 is provided with a first position sensor 42. The first position sensor is an antenna for the reception of GPS signals. Although this sensor is located on the roof of the operator's cab 16, it may be located at any position on the combine where it would receive a good GPS signal.

The front of the operator's cab 16 is provided with a second position sensor 44. The second position sensor 44 has a transmitter for emitting laser radiation which reaches the ground approximately 10 meters ahead of the vehicle 10. The laser radiation is reflected back from the ground or crop to the sensor 44 which is also provided with a receiver for receiving this reflected radiation. The distance to the reflection point from the sensor 44 is determined by the propagation time of the laser radiation to be received by the receiver. The second position sensor 44 is pivoted about an approximately vertical axis, in order to scan a region transverse to the direction of forward movement of the vehicle 10. The signal of the receiver makes it possible to establish the angle between the forward operating direction and the position of the boundary of standing crop. Such position sensors 44 are known and are described, for example, in U.S. Pat. Nos. 6,095,254, and 6,101,795, whose disclosures are incorporated herein by reference. There is a possibility of using a laser distance sensor in which the transmitter and receiver are not rotated, but a mirror rotating step-by-step or continuously is used to scan the visible region. It can scan an angular region of up to 180°. Such sensors are available from Sick A. G., D-72796, Reute, under the designation LMS.

The first position sensor 42 and the second position sensor 44 communicate over a bus with a controller 46 having a memory 48. The controller 46 supplies a steering signal to a steering controller 50. The steering controller 50 is used for controlling the steering angle of the rear steerable wheels 14.

Figure 2:
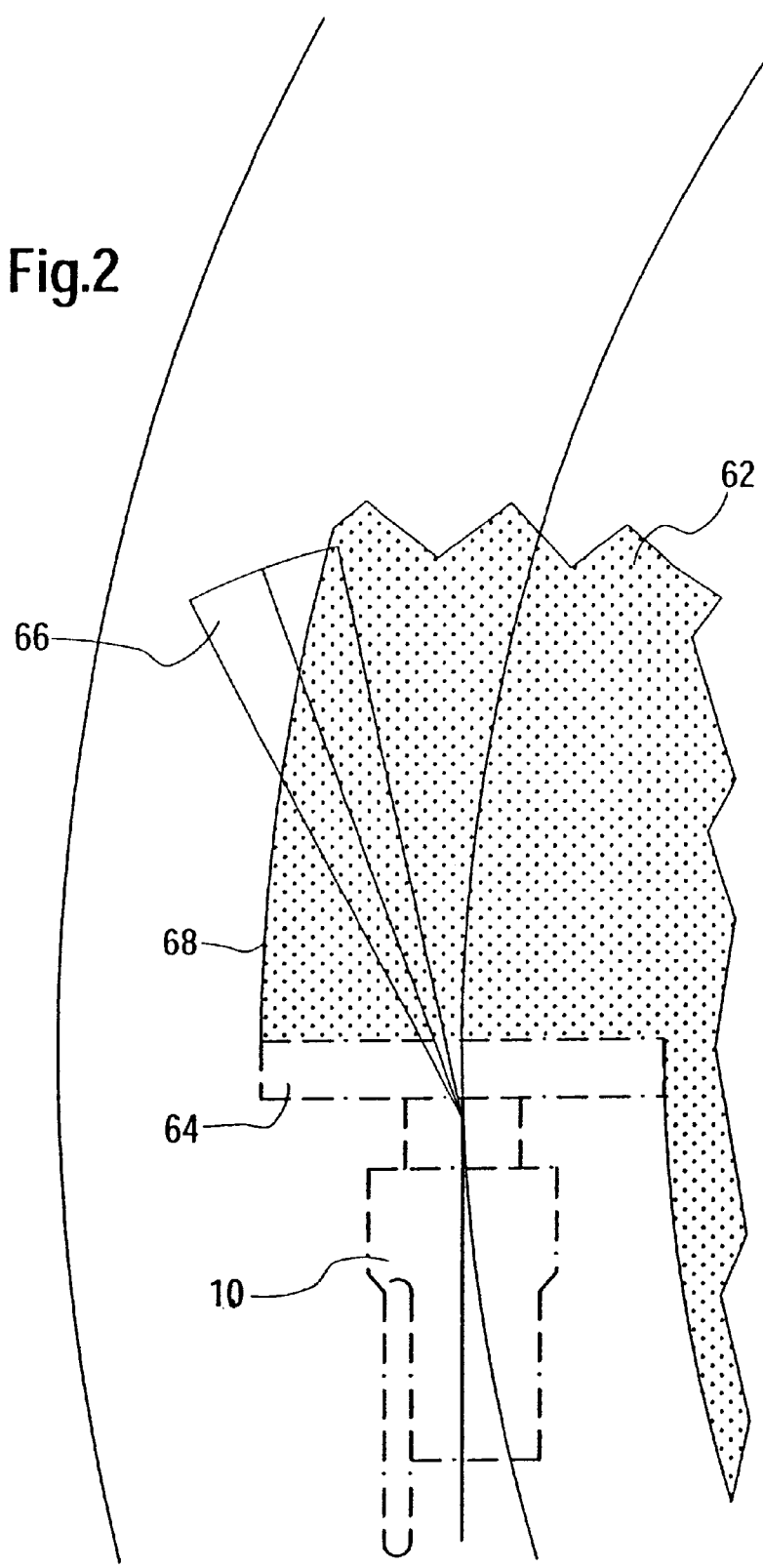
FIG. 2 shows a plan view of the utility vehicle during the harvesting of a field.

FIG. 2 shows a plan view of the utility vehicle 10 during an agricultural harvesting operation. The harvesting assembly 64 is a harvesting platform, that cuts the plants (cereal crop) from the field. Numerical designator 68 characterizes the boundary of operation between the previously harvested proportion of the field and the plants 62 that are still to be harvested. This boundary of operation in this application is known as a crop edge. The angular region covered by the scanning sensor 44 is scanning region 66. It can be seen that the right portion of the scanning region 66 overlaps the boundary of operation 68. Furthermore, it can be seen that a time delay exists between the measurement of the position of the boundary of operation 68 and the point in time at which the vehicle 10 reaches the measurement point. This time delay must be considered in the providing a steering signal to the steering controller 50.

FIG. 3 is a flow chart illustrating the operation of the controller 46. After the start in step 100, step 102 follows in which the first position signal of the first position sensor 42 is received. The position signal transmitted by the position sensor 42 from the satellite antenna may exhibit differing degrees of accuracy depending on external conditions. Position sensor 42 may have a limited view of the sky and may not receive a sufficiently large number of GPS satellites or in the case DGPS may not receive the correction signals. Obstacles located in the vicinity of the utility vehicle such as buildings or trees create errors in the propagation time that can also reduce the accuracy. Therefore the first position sensor transmits signal quality information about the quality or the accuracy of the first position signal, that is derived from the number of GPS satellites received at that time and the amplitude (field strength) of the signals received by the first position sensor 42. The first singal quality information transmitted to the controller 46 is therefore a measure of the accuracy or reliability of the first position signal.

In the following step 104, the controller 46 receives a second position signal from the second position sensor 44. The second position signal contains distance information as well as the angle between the longitudinal centerline of the utility vehicle 10 and the crop edge at that time. Optical sensors for the recognizing crop edges of a windrow or standing crop may operate with less accuracy in dusty conditions, in fog, with lodged grain crop, and in very thin crop stands. In addition these sensor may have difficulty in finding the crop edge when operating around sharp curves, upon entry into a crop stand, upon reaching the end of the field, and for when several edges are encountered. In these cases the second position signal would not be as accurate and precise influencing the steering negatively. For this reason the controller 46 is supplied with a second signal quality information that is derived from the size of the change in the signal at the crop edge received by the receiver of the second position sensor 44. The greater the change in the signal from the crop edge, the more precise the measurement of the angle will be by which the crop edge is located.

In step 106, the actual position of the utility vehicle 10 is calculated from the first position signal and the second position signal. The second position signal contains information about the position of the utility vehicle 10 relative to the crop edge, whose accuracy is in the centimeter range. Since the harvesting operation normally is performed along parallel tracks with an offset that is specific to the harvesting assembly, the crop edge can be calculated from previous crossings of the field, in which the position of the utility vehicle 10 was stored in memory 48. On the basis of the position previously calculated of the crop edge and the position of the utility vehicle 10 relative to it, the second position signal can be utilized to improve the accuracy of the first position signal. The position of the utility vehicle 10 is determined by considering the direction and the velocity of the vehicle 10 as well as the distance required by the vehicle 10 to cover the time delayed location sensed by the second position sensor 44. In this way the first position signal from the first position sensor 42 is compared with the time delayed second position signal of the second position sensor 44. The controller 46 considered both position signals and the quality information associated with both position signals. The better the quality of one of the signals relative to the other signal, the more strongly it is considered and weighted in calculating the actual position of the utility vehicle 10.

In the next step 108, the controller 46 evaluates the accuracy of the second position signal to determine if it is greater than a threshold value stored in memory 48, that corresponds to an accuracy of a few centimeters. If the accuracy is sufficient, step 110 follows, in which a steering signal is generated, based on the second position signal, and is transmitted to the steering controller 50. The steering signal is selected by the controller 46 on the basis of the second position signal or the position calculated in step 106 in such a way that the utility vehicle 10 is guided in a manner known in itself along the crop edge. The target path information stored in memory 48 corresponds to the intended path along the crop edge where, however, no map is stored in memory, but only the desired transverse distance between the longitudinal centerline of the utility vehicle 10 and the crop edge. In step 112 the controller 46 orders that the position information calculated in step 106 be stored in memory 48. Step 112 is again followed by step 102.

If step 108 concludes that the accuracy of the second position signal is not adequate, step 114 follows, in which the position signal as was calculated in step 106, whose accuracy can be improved in case the accuracy of the second position signal is inadequate or independent thereof can be improved by local sensors for the movement of the utility vehicle 10, the steering angles and acceleration and possibly the inclination of the slope, and generates a steering signal from the path previously covered by the utility vehicle 10 that was recorded in the memory arrangement 48, and supplies this to the steering controller 50. Since the operation on the field is normally performed in parallel paths with an offset depending on the width of the crop recovery arrangement, the path of the utility vehicle 10 can be predicted on the basis of the position calculated in step 106 (as was recorded). The method of the designation of the target path (for example, by a map, on the basis of the boundary of the operation or the previous path) may also be provided as input by the operator, in addition to the automatic selection. Step 114 is followed by step 112.

Having described the preferred embodiment, it will become apparent that various modifications can be made without departing from the scope of the invention as defined in the accompanying claims.

I claim:

1. A system for automatically steering a utility vehicle along an intended target path, the system comprising:

a first position sensor generating a first position signal indicating the position of the utility vehicle at a point in time;

a second position sensor generating a second position signal indicating the position of the utility vehicle at a point in time;

a controller in communication with the first position sensor and the second position sensor for receiving the first position signal and the second position signal, the controller having a memory in which is stored target path information that includes information about the intended target path of the utility vehicle, one of the first and second position signals includes signal quality information that is evaluated by the controller in locating the utility vehicle along the intended target path, in response to the first and second position signals, the signal quality information and the target path information the controller generates a steering signal;

a steering controller is in communication with the controller for receiving the steering signal and steering the utility vehicle in response to the steering signal.

2. A system as defined by claim 1 wherein the intended target path is stored as a map in the memory.

3. A system as defined by claim 1 wherein the intended target path is based on previous positions of the utility vehicle relative to a fixed location.

4. A system as defined by claim 3 wherein the fixed location is a boundary of operation.

5. A system as defined by claim 3 wherein the fixed location is a path previously traversed by the utility vehicle.

6. A system as defined by claim 1 wherein both the first position signal and the second position signal have signal quality information about the respective position signal, the controller gives weighted consideration to the first position signal and the second position signal to a degree corresponding to the signal quality information for each respective signal in generating the steering signal.

7. A system as defined by claim 2 wherein both the first position signal and the second position signal have signal quality information about the respective position signal, the controller gives weighted consideration to the first position signal and the second position signal to a degree corresponding to the signal quality information for each respective signal in generating the steering signal.

8. A system as defined by claim 3 wherein both the first position signal and the second position signal have signal quality information about the respective position signal, the controller gives weighted consideration to the first position signal and the second position signal to a degree corresponding to the signal quality information for each respective signal in generating the steering signal.

9. A system as defined by claim 1 wherein the first position signal is a satellite signal.

10. A system as defined by claim 2 wherein the first position signal is a satellite signal.

11. A system as defined by claim 3 wherein the first position signal is a satellite signal.

12. A system as defined by claim 6 wherein the first position signal is a satellite signal.

13. A system as defined by claim 1 wherein the second position signal is generated by a local position sensor attached to the utility vehicle, that is arranged to detect the position of the utility vehicle relative to a fixed location.

14. A system as defined by claim 2 wherein the second position signal is generated by a local position sensor attached to the utility vehicle, that is arranged to detect the position of the utility vehicle relative to a fixed location.

15. A system as defined by claim 3 wherein the second position signal is generated by a local position sensor attached to the utility vehicle, that is arranged to detect the position of the utility vehicle relative to a fixed location.

16. A system as defined by claim 6 wherein the second position signal is generated by a local position sensor attached to the utility vehicle, that is arranged to detect the position of the utility vehicle relative to a fixed location.

17. A system as defined by claim 12 wherein the second position signal is generated by a local position sensor attached to the utility vehicle, that is arranged to detect the position of the utility vehicle relative to a fixed location.

18. A system as defined by claim 13 wherein the fixed location detected by the local sensor is a boundary of the operation.

19. A system as defined by claim 18 wherein the boundary of operation is a crop edge.

20. A system as defined by claim 18 wherein the controller calculates an expected boundary of operation.

21. A system as defined by claim 20 wherein the second position sensor is a laser scanning sensor having a scanning region, the scanning region can be directed to cover the expected boundary of operation.

22. A harvesting machine having an intended target path for harvesting crop in a field, the harvesting machine comprising:

a supporting structure having a front;

a harvesting assembly is mounted to the front on the supporting structure for harvesting crop material;

a first position sensor generating a first position signal indicating the position of the harvesting machine;

a second position sensor generating a second position signal indicating the position of the harvesting machine;

a controller in communication with the first position sensor and the second position sensor for receiving the first position signal and the second position signal, the controller having a memory in which is stored target path information that includes information about the intended target path of the harvesting machine, one of the first and second position signals includes signal quality information that is evaluated by the controller in locating the harvesting machine along the intended target path, in response to the first and second position signals, the signal quality information and the target path information the controller generates a steering signal;

a steering controller is in communication with the controller for receiving the steering signal and steering the harvesting machine in response to the steering signal.

23. A harvesting machine as defined by claim 22 wherein the intended target path is based on previous positions of the utility vehicle relative to fixed location.

24. A harvesting machine system as defined by claim 23 wherein the fixed location is a boundary of operation.

25. A harvesting machine as defined by claim 23 wherein the fixed location is a path previously traversed by the utility vehicle.

26. A harvesting machine as defined by claim 23 wherein both the first position signal and the second position signal have signal quality information about the respective position signal, the controller gives weighted consideration to the first position signal and the second position signal to a degree corresponding to the signal quality information for each respective signal in generating the steering signal.

27. A harvesting machine as defined by claim 26 wherein the first position signal is a satellite signal.

28. A harvesting machine as defined by claim 27 wherein the second position signal is generated by a local position sensor attached to the harvesting machine, that is arranged to detect the position of the harvesting machine relative to the fixed location.

* * * * *